(12) United States Patent
Harley et al.

(10) Patent No.: US 7,304,637 B2
(45) Date of Patent: Dec. 4, 2007

(54) PUCK-BASED INPUT DEVICE WITH ROTATION DETECTION

(75) Inventors: Jonah Harley, Mountain View, CA (US); Dale Schroeder, Scotts Valley, CA (US)

(73) Assignee: Avago Technologies ECBUIP (Singapore) Pte Ltd

( * ) Notice: Subject to any disclaimer, the term of this patent is extended or adjusted under 35 U.S.C. 154(b) by 445 days.

(21) Appl. No.: 10/931,113

(22) Filed: Aug. 30, 2004

(65) Prior Publication Data

US 2006/0044260 A1  Mar. 2, 2006

(51) Int. Cl.
*G09G 5/00* (2006.01)
(52) U.S. Cl. ........................................ 345/163; 345/156
(58) Field of Classification Search ................. 345/156, 345/157, 160, 161; 341/20–22
See application file for complete search history.

(56) References Cited

U.S. PATENT DOCUMENTS

| 36,579 | A | * | 9/1862 | Pascucci et al. ................. 238/26 |
| 6,256,012 | B1 | * | 7/2001 | Devolpi ........................... 345/161 |
| 6,717,878 | B2 | * | 4/2004 | Hagura et al. ................... 365/211 |
| 7,049,991 | B2 | * | 5/2006 | Kimura ............................ 341/144 |
| 7,145,379 | B2 | * | 12/2006 | Date et al. ....................... 327/431 |
| 2003/0174152 | A1 | * | 9/2003 | Noguchi .......................... 345/690 |
| 2003/0184568 | A1 | * | 10/2003 | Date et al. ....................... 345/690 |
| 2003/0185031 | A1 | * | 10/2003 | Hagura et al. .................. 365/22 |
| 2005/0110666 | A1 | * | 5/2005 | Date ................................. 341/144 |
| 2005/0110755 | A1 | * | 5/2005 | Harley et al. ................... 345/160 |
| 2005/0174306 | A1 | * | 8/2005 | Agari et al. ..................... 345/76 |
| 2006/0044260 | A1 | * | 3/2006 | Harley et al. ................... 345/156 |
| 2006/0158362 | A1 | * | 7/2006 | Shimizu et al. ................. 341/144 |
| 2006/0192754 | A1 | * | 8/2006 | Sachs et al. ..................... 345/157 |
| 2006/0232551 | A1 | * | 10/2006 | Matta .............................. 345/156 |
| 2006/0250357 | A1 | * | 11/2006 | Safai ............................... 345/157 |
| 2006/0267933 | A1 | * | 11/2006 | Tai et al. ......................... 345/157 |
| 2006/0271886 | A1 | * | 11/2006 | Wenstrand et al. ............. 715/860 |

FOREIGN PATENT DOCUMENTS

GB                2247938        *   3/1992

* cited by examiner

*Primary Examiner*—Amare Mengistu
*Assistant Examiner*—Afroza Y Chowdhury

(57) ABSTRACT

The present invention includes a pointing device having a first surface on which a puck field of motion is defined, a moveable puck, and a position detector. The moveable puck is confined to move on the first surface within the puck field of motion. The position detector determines a position of the puck in the puck field of motion and an angle of rotation of the puck about an axis perpendicular to the first surface. In one embodiment, the puck includes a puck electrode on a second surface on the puck that is parallel to the first surface. The first surface includes first, second, and third electrodes that are parallel to the puck electrode, the puck electrode overlying a portion of each of the first, second, and third electrodes.

3 Claims, 4 Drawing Sheets

PUCK-BASED INPUT DEVICE WITH ROTATION DETECTION

BACKGROUND OF THE INVENTION

Modern computer operating systems and graphics programs require a pointing device for controlling the position of a cursor on the computer display. Likewise, handheld devices such as personal information managers and cell phones would also benefit from the inclusion of such a pointing device. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate a desired cursor movement on the screen, the user simply picks up the mouse and recenters the mouse in the workspace.

In addition to providing the above-described pointing function, the mouse has evolved to include additional buttons and wheels that are used to provide other forms of input to the computer. For example, most mouse designs now provide a second button for signaling an application specific action such as displaying a menu from which the user can select other functions. In addition, a scroll wheel is provided in many designs. The scroll wheel is used to scroll text on the screen or control other multi-valued functions in specific applications. For example, the zoom level in many graphics programs can be increased or decreased by rotating the scroll wheel.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. In addition, the need to carry a separate pointing device makes the mouse less than ideal for these applications. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the computer or hand held device. Finally, the usual constraints of low cost, low power consumption and high reliability must also be met.

Currently, there are two dominant solutions to the pointing device problem in the laptop marketplace, the Synaptics capacitive TouchPad™ and the IBM TrackPoint™. Other companies make versions of these devices with similar functionality. Both of these devices fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program.

The TouchPad™ is a blank rectangular pad, two to four inches on a side, typically placed below the keyboard of most laptops. The device senses the position of a finger on the surface of the rectangle relative to the edges of the device. This sensing is accomplished by measuring the capacitance changes introduced by a user finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Such determinations are, at best, therefore, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

In previously filed U.S. patent application Ser. No. 10/723,957, which is hereby incorporated by reference, a pointing device that meets these requirements is described. The pointing device utilizes a puck that moves in a defined field of motion when a user applies pressure to the puck via the user's finger. When the user releases the puck, a set of springs returns the puck to its centered position within the field of motion. The position of the puck and the pressure on the puck are determined by electrodes in the device. The position information is used to position a cursor on the display screen. Software on the attached device translates the motion of the puck during the time the user's finger is pressing on the puck into the appropriate cursor motion on the device's display. When the user releases the puck, the coupling between the puck and the cursor position is broken by the software, and hence, the cursor does not move backwards while the puck is being recentered.

While the device taught in the above-described patent application provides significant advantages over the dominant prior art solutions to the pointing device problem in the laptop marketplace, there are a number of areas in which improvements would be useful. In particular, this puck-based pointing device would benefit from the inclusion of additional input functions that provide the functionality of the scroll wheels discussed above.

SUMMARY OF THE INVENTION

The present invention includes a pointing device having a first surface on which a puck field of motion is defined, a moveable puck, and a position detector. The moveable puck is confined to move on the first surface within the puck field of motion. The position detector determines a position of the puck in the puck field of motion and an angle of rotation of the puck about an axis perpendicular to the first surface. In one embodiment, the puck includes a puck electrode on a second surface on the puck that is parallel to the first surface. The first surface includes first, second, and third sense electrodes that are parallel to the puck electrode, the puck electrode overlying a portion of each of the first, second, and third sense electrodes. In one embodiment, the position detector includes a circuit for measuring the capacitance between the puck electrode and each of the first, second, and third electrodes. In one embodiment, the puck electrode includes a planar layer of conducting material having a shape that is not rotationally symmetric about any axis through the puck and perpendicular to the first surface. In one embodiment, the puck electrode includes a planar layer of conducting material having a shape that is circularly symmetric about an axis perpendicular to the planar layer, and the planar layer is divided into first and second sections that are separated from one another, at least one of said sections being asymmetric. For example, the first section is not circularly symmetric about the axis. In one embodiment, a finger sensing electrode is included in the puck. The finger sensing electrode includes a conducting layer overlying the puck electrode and is moveable with respect thereto. The position detector includes a circuit for measuring the capacitances between the puck electrode and each of the finger sensing electrode, the first electrode, the second electrode, and the third electrode.

DETAILED DESCRIPTION OF THE PREFERRED EMBODIMENTS OF THE INVENTION

Figure 1:
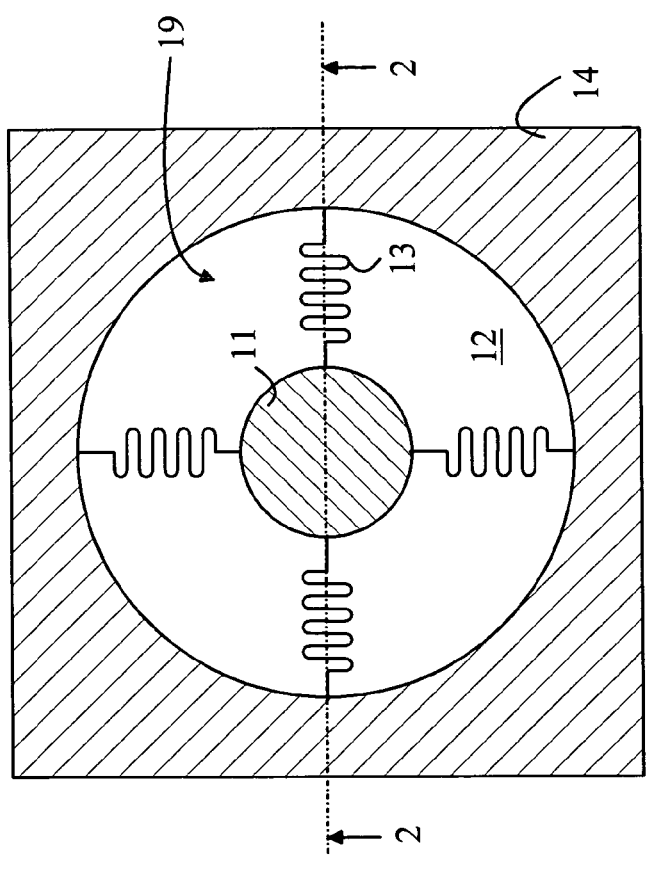
FIG. 1 is a top view of pointing device 10.
Figure 2:
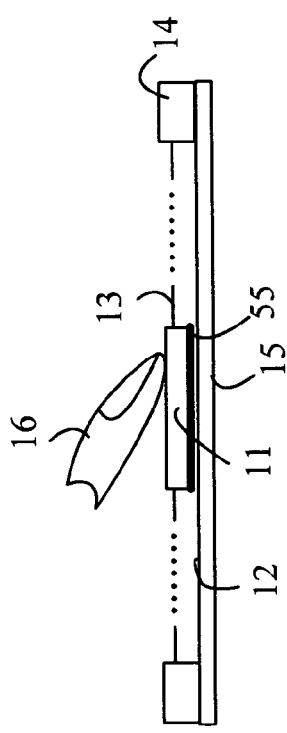
FIG. 2 is a cross-sectional view of pointing device 10 through line 2-2 shown in FIG. 1.

The manner in which the present invention provides its advantages can be more easily understood with reference to FIGS. 1 and 2, which illustrate a pointing device 10 according to one embodiment of the invention taught in the above-described patent application. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 includes a pressure sensing mechanism that measures the vertical pressure applied to puck 11. When the sensed pressure exceeds a predetermined threshold, the cursor tracking function is activated and the cursor moves on the screen in a direction and distance determined by the motion of the puck. In addition, pointing device 10 includes a sensing mechanism for determining the position of puck 11 on surface 12.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

The above-described patent application teaches a number of mechanisms for measuring the pressure exerted by the user on the puck, and hence, these mechanisms will not be discussed in detail here. For the purposes of this discussion, it is sufficient to note that a puck having a top surface that can move relative to the bottom surface can be utilized. The top surface is held in place by a spring mechanism. When the user applies pressure to the top surface, the top surface moves toward the bottom surface by an amount that depends on the applied pressure. The distance between the top and bottom surfaces of the puck is measured utilizing one of a number of methods. For example, the top and bottom surfaces of the puck can include conducting layers that form a parallel plate capacitor. The capacitance of this capacitor depends on the distance between the plates, and hence, a measurement of the capacitance provides a measurement of the pressure applied by the user.

Figure 3:
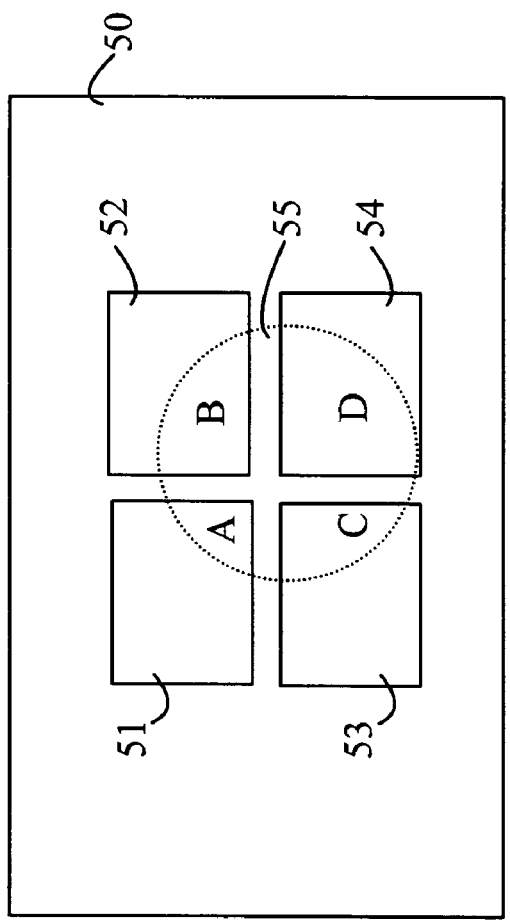
FIG. 3 is a top view of a portion of the surface shown in FIG. 1 over which the puck moves in one embodiment of the present invention.

The manner in which the position of the puck is sensed in one embodiment is described in detail in the above-identified patent application, and hence, will not be discussed in detail here. For the purposes of this discussion, it will be assumed that a capacitive sensing scheme can be utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 4:
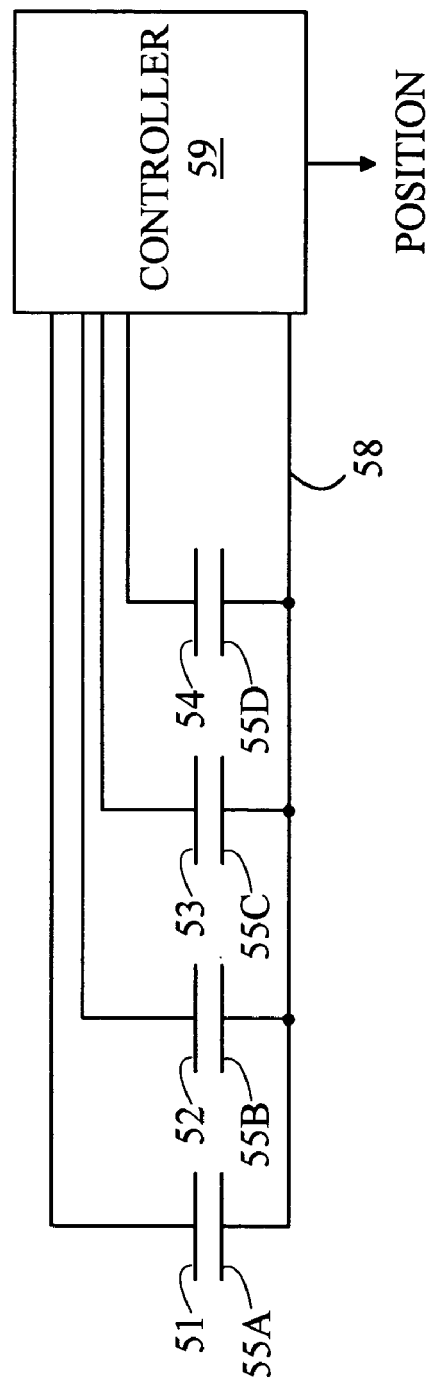
FIG. 4 is a schematic drawing of an equivalent circuit for electrodes 51-55.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode shown at 58. This electrode is just electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

In the embodiments discussed above, the electrode on the bottom of the puck is preferably circular in shape to reduce errors arising from the shape of the electrode. The restoring springs allow the puck to rotate somewhat. If the user's finger is not centered on the puck during the motion of the puck, the resultant torque can cause the puck to rotate slightly. If the puck electrode is circularly symmetric, such rotations will not alter the position measurement. If, on the other hand, the puck electrode is not circularly symmetric, the degree of overlap between the puck and the various electrodes will be different for different rotations, even though the center of the puck is at the same location in each case.

The present invention is based on the observation that such asymmetric electrode designs can be used to measure the orientation of the puck, which can be useful information for cursor control or additional functions. For example, the puck rotation can be measured and used to implement an additional function such as scrolling. The rotation of the puck in gaming actions can be used to rotate an object in the game. For example, in a game in which an army tank moves about a field of battle, the puck rotation can be used to control the direction of the turret on the tank.

Figure 5:
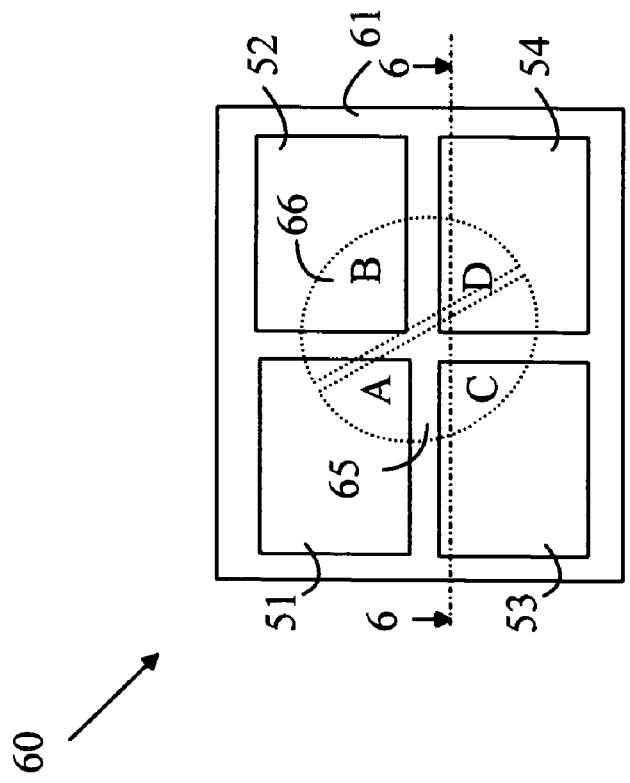
FIG. 5 illustrates an arrangement where the electrode arrangement is intentionally asymmetric to provide a measurement of the puck rotation.

To provide a measurement of the puck rotation, the electrode arrangement is intentionally asymmetric. Refer now to FIG. 5, which illustrates one such arrangement. Pointing device 60 includes 4 electrodes 51-54 that are located on the bottom of the field of motion 61. The puck electrode is divided vertically into two halves shown at 65 and 66. The capacitance between each of the electrodes on the surface and each of the puck electrodes is then measured. Both the position and rotation can be computed from these capacitance measurements. The rotation information can then be used to implement scrolling or some other feature.

As noted above, some puck rotation can occur during the normal motion of the puck. If this is a problem, the rotational information can be restricted to rotations that occur when the puck is at or near its resting position. In this regard, it should be noted that the return springs will also return the puck to a predetermined orientation.

In one embodiment of the present invention, the two halves of the puck electrode are designed such that the electrode obtained by electrically connecting the halves has a rotationally symmetric shape. In this case, the circuit arrangement shown in FIG. 3 can be utilized to determine the puck position by electrically connecting the halves during the position measurement. The same measurements can be repeated first with one half disconnected and then with the other half disconnected to provide the rotational information.

The above-described embodiments utilized a puck electrode that was split into two portions. However, other electrode designs can be utilized. The capacitive measurements may be viewed as providing the area of the puck electrode that overlaps each of the sense electrodes in the field of motion. These overlap measurements must provide the displacement of the puck from some point of reference and the rotation of the puck about an axis on the puck. For simplicity, the displacement will be specified in Cartesian coordinates (x,y), and the rotation angle will be specified by A. Accordingly, there must be at least three sense electrodes. In addition, the electrodes shape and position must be such that both the x and y displacements can be determined. For example, if all of the electrodes have the same shape and are aligned on a line in the x-direction, the y displacement could not be determined.

The shape of the puck electrode preferably satisfies two conditions if each possible position and rotation is to be detectable. First, the shape of the electrode must not be circularly symmetric about any axis in the field of motion. If this condition is not met, there may be a (x, y, A) set of values that provides the same overlap values as another (x, y, A) set. In addition, the puck electrode must overlap all of the sense electrodes for each possible puck location and rotation. In embodiments in which the puck electrode is small compared to the field of motion, more than three sense electrodes may be used to cover the surface of the field of motion. In such embodiments, it is sufficient that the puck electrode overlaps three of these electrodes, provided these three electrodes are not arranged in a straight line. If these conditions are not met, operable pointing devices can still be constructed; however, the pointing devices may produce erroneous results at some locations.

As noted above, the pressure on the top surface of the puck is used to detect the presence of the user's finger and to simulate a "clicking" operation analogous to that used in a conventional mouse to signal the program that the present location of the cursor controlled by the puck is to be used for some function. For example, the click is used to signal the data processing system that the item of a list on the screen to which the cursor is now pointing should be selected. It should be noted that the same capacitive measuring system discussed above for determining the position and rotation of the puck can also be used to measure the pressure exerted by the user on the puck.

Figure 6:
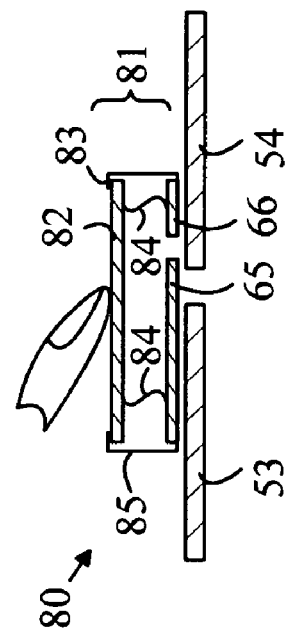
FIG. 6 is a cross-sectional view of the pointing device such as that shown in FIG. 5 through line 6-6.

Refer now to FIG. 6, which is a cross-sectional view of the pointing device such as that shown in FIG. 5 through line 6-6. Pointing device 80 utilizes a puck 81 having a top electrode 82 suspended on springs 84 above the bottom surface of puck 81 on which electrodes 65 and 66 are located. In this embodiment, electrode 82 is prevented from leaving puck 81 by flange 83 in the outer shell 85 of puck 81. When the user pushes on electrode 82, electrode 82 moves toward electrodes 65 and 66 a distance that depends on the force applied to electrode 82. Hence, the distance between electrode 82 and electrode 65 or 66 provides a measure of the applied force. This distance is determined by measuring the capacitance of a capacitor formed by electrode 82 and one or both of electrodes 65 and 66.

Figure 7:
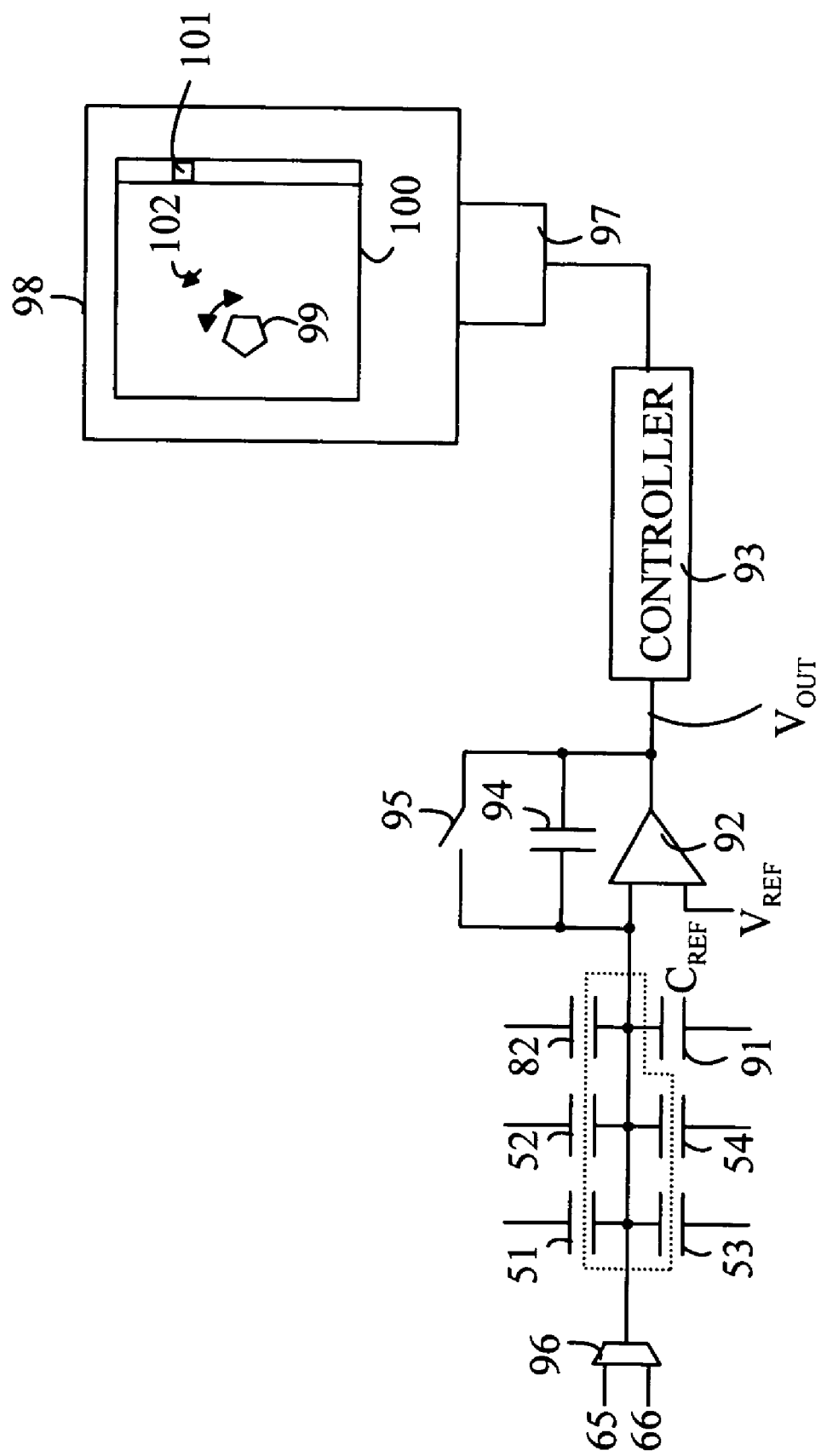
FIG. 7 is a schematic drawing of a circuit for measuring the various capacitances.

As noted above, the position of puck 81 in the field of motion and the rotation of puck 81 can also be determined by measuring capacitances. In this case, the capacitances are those between electrodes 65 and 66 and electrodes 51-54. Refer now to FIG. 7, which is a schematic drawing of a circuit for measuring the various capacitances. It should be noted that electrodes 65 and 66 can be connected separately to the input of op-amp 92 or together, depending on the particular capacitance that is being measured. The particular one of these electrodes that is connected to the op-amp is determined by controller 93 via multiplexer 96. To simplify the drawing, the particular connections from the controller to the multiplexer and the electrodes have been omitted. For the purpose of this discussion, it will be assumed that electrode 65 is connected. When reset switch 95 is first closed, sense electrode 65 and the output voltage $V_{OUT}$ are forced to the potential $V_{REF}$. After the reset switch is reopened, a drive voltage $V_1$ is applied to one of electrodes 51-54, 65, or 82 by controller 93. Consider a measurement on electrode 51. Charge will develop across the relevant capacitor according to $Q_1=C_1 \cdot (V_1-V_{REF})$, where $C_1$ is the capacitance of the capacitor formed by electrode 65 and electrode 51. Since no charge can move onto or off of the sense electrode 65, the op-amp will apply a voltage across feedback capacitor 94 to keep electrode 65 at potential $V_{REF}$. Thus $V_{OUT}-V_{REF}=C_1/C_{REF} \cdot (V_{REF}-V_1)$, where $C_{REF}$ is the capacitance of capacitor 91. By sequentially making such measurements on each of the driven electrodes, the position of the puck, the rotational angle of the puck, and the pressure being applied to the finger sensor can be ascertained. This circuit is advantageous for this application because it allows numerous capacitance measurements to be made using a single op-amp and simple digital drive signals.

The signals derived for the location and rotation are then forwarded to the data processing system 97 attached to the pointing device to control the location of cursor 102 and/or other features on display 98 attached to the data processor. For example, the angle of rotation can be used to rotate a selected object such as object 99 displayed on the display or to operate the scroll bar 101 on a window 100 shown on the display.

Various modifications to the present invention will become apparent to those skilled in the art from the foregoing description and accompanying drawings. Accordingly, the present invention is to be limited solely by the scope of the following claims.

What is claimed is:

1. A pointing device, comprising:
   a first surface having a puck field of motion defined thereon;
   a moveable puck confined to move on said first surface; and
   a position detector that determines a position of said puck in said puck field of motion and an angle of rotation of said puck about an axis perpendicular to said surface,
   wherein said puck comprises a puck electrode on a second surface on said puck that is parallel to said first surface,
   wherein said first surface comprises first, second, and third sense electrodes that are parallel to said puck electrode, said puck electrode overlying a portion of each of said first, second, and third sense electrodes, and
   wherein said puck electrode comprises a planar layer of conducting material having a shape that is circularly symmetric about an axis perpendicular to said planar layer, said planar layer being divided into first and second sections that are separated from one another.

2. The pointing device of claim 1 wherein said first section is not circularly symmetric about said axis.

3. A pointing device, comprising:
   a first surface having a puck field of motion defined thereon;
   a moveable puck confined to move on said first surface; and
   a position detector that determines a position of said puck in said puck field of motion and an angle of rotation of said puck about an axis perpendicular to said surface,
   wherein said puck comprises a puck electrode on a second surface on said puck that is parallel to said first surface,
   wherein said first surface comprises first, second, and third sense electrodes that are parallel to said puck electrode, said puck electrode overlying a portion of each of said first, second, and third sense electrodes,
   said puck further comprising a top electrode comprising a conducting layer overlying said puck electrode and being moveable with respect thereto, and wherein said position detector comprises a circuit for measuring the capacitances between said puck electrode and each of said top electrode, said first sense electrode, said sense second electrode, and said sense third electrode.

* * * * *